United States Patent [19]

Undin et al.

[11] Patent Number: 4,472,877
[45] Date of Patent: Sep. 25, 1984

[54] TOOL FOR REMOVING INSULATION FROM CABLES

[75] Inventors: Hans Undin, Akersberga; Hans Wiener, Taby, both of Sweden

[73] Assignee: C.A. Weidmuller GmbH & Co., Detmold, Fed. Rep. of Germany

[21] Appl. No.: 330,661

[22] Filed: Dec. 14, 1981

[51] Int. Cl.³ .................... H02G 1/12; B26B 27/00
[52] U.S. Cl. ............................ 30/90.7; 81/9.5 R; 30/90.8; 30/92.5; 30/96
[58] Field of Search ................... 81/9.5 R, 9.5 C; 30/90.6, 90.7, 90.8, 92, 92.5, 93–96, 90.1, 90.2, 90.4

[56] References Cited

U.S. PATENT DOCUMENTS

| | | | |
|---|---|---|---|
| 98,294 | 12/1869 | Peace | 30/94 |
| 1,979,487 | 11/1934 | Pedersen | 30/90.7 |
| 2,141,002 | 12/1938 | Huff | 30/90.7 |
| 2,830,366 | 4/1958 | Chisena | 30/90.7 |
| 3,483,617 | 12/1969 | Krampe | 81/9.5 R X |
| 3,665,603 | 5/1972 | Bilbrey et al. | 30/90.7 |
| 3,881,249 | 5/1975 | Cox, Jr. | 81/9.5 C X |
| 3,946,487 | 3/1976 | Bieganski | 30/90.7 |

FOREIGN PATENT DOCUMENTS 555009 7/1943 United Kingdom ............. 30/90.7

Primary Examiner—Frederick R. Schmidt
Assistant Examiner—Debra S. Meislin
Attorney, Agent, or Firm—Toren, McGeady and Stanger

[57] ABSTRACT

A tool for removing insulation from cables includes a handle, a housing rotatably mounted in the handle, and a cutting blade mounted in and projecting out of the housing. A recess is formed in the surface of the housing from which the cutting blade projects. A holder stirrup positioned in the handle, holds the cable in position against the cutting blade.

11 Claims, 9 Drawing Figures

TOOL FOR REMOVING INSULATION FROM CABLES

SUMMARY OF THE INVENTION

The present invention is directed to a tool for removing the insulation from cables. In removing the insulation, the cable end to be stripped is held in place by a holder stirrup and a stripping blade pierces the insulation at a single location. Subsequently, the tool is turned by moving a rod-shaped handle around the cable so that the original hole formed by the cutting or stripping blade is extended circumferentially around the cable. Next, the blade is rotated about its own axis through 90° and the tool is moved in the axial direction of the cable slitting the insulation so that it can be easily removed. Tools of this type are known, for instance note British Patent Specification No. 1 458 366.

The primary object of the present invention is to improve the tool mentioned above, particularly to afford convenient handling and reliable functioning when stripping insulation from large diameter cables.

In accordance with the present invention, a tool for removing insulation from cables, particularly large diameter cables, includes a cutting blade positioned in a housing and the housing has a supporting surface through which the cutting blade projects. This surface provides a support for the cable being stripped. The housing is rotatably mounted in an elongated handle. A holder stirrup extends into the handle and presses the cable against the cutting blade. The supporting surface has a central recess extending around the cutting blade and the recess receives a portion of the cable insulation during the stripping operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
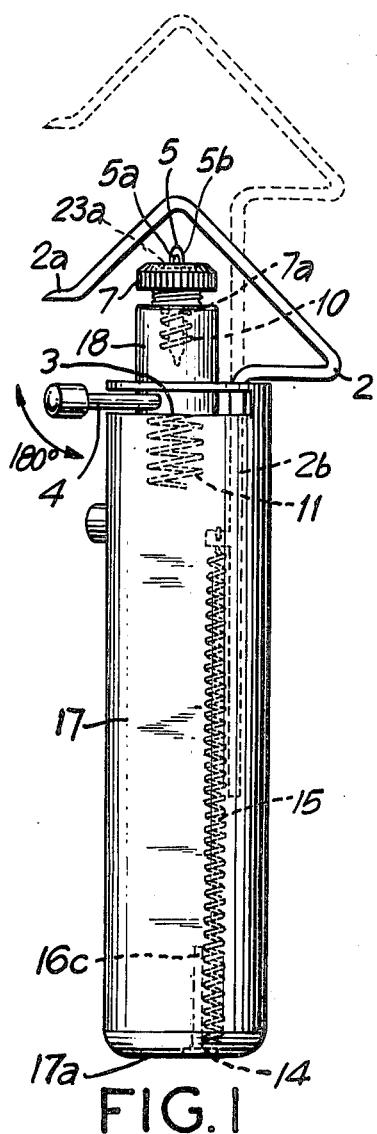
FIG. 1 is a side elevation view of a tool embodying the present invention.
Figure 2:
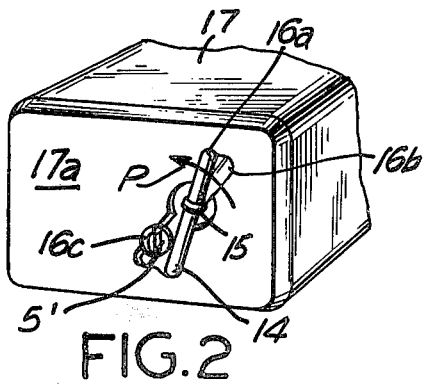
FIG. 2 is a perspective view of the bottom of the tool shown in FIG. 1 illustrated on a larger scale.
Figure 3:
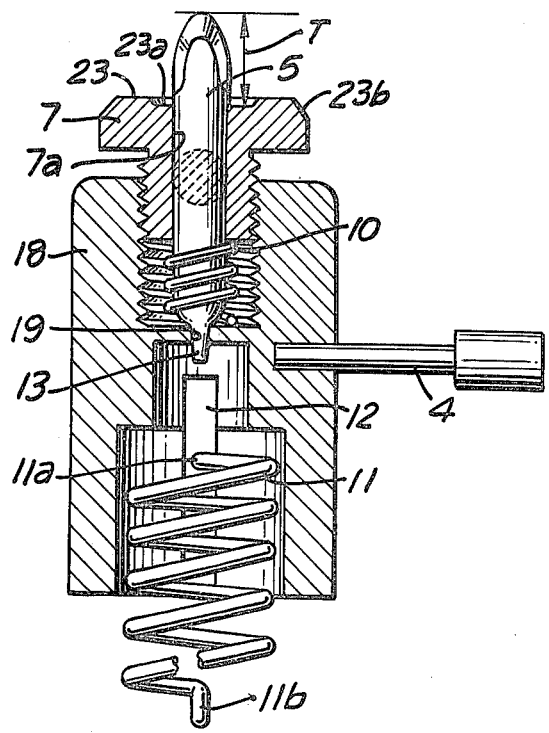
FIG. 3 is an enlarged axial sectional view through the upper part of the tool shown in FIG. 1.

In FIGS. 1, 2 and 3 a replaceable cutting blade 5 is positioned within a housing 18. A lever 4 is secured to and extends laterally outwardly from the housing 18. The lever 4 is movable through a slot formed in one end of a handle 17. The slot extends transversely of the elongated direction of the handle and is dimensioned so that the housing 18 can be rotated within certain limits within the handle.

Figure 4:
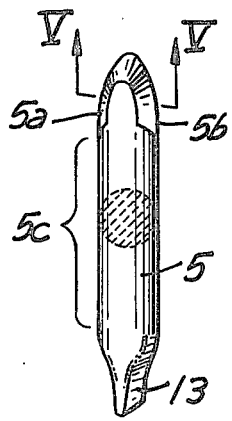
FIG. 4 is a side view of the cutting blade shown in FIG. 1, also illustrated on a larger scale.

With the lever 4 guided in the slot 3, the housing is securely held in one end of the handle 17. The cutting blade 5 at its opposite end from the cutting edge has a planar portion or tongue 13, note FIG. 4, which fits in a correspondingly shaped opening 19, note FIG. 3, in the housing 18. With the replaceable cutting blade 5 secured within the opening 19 in the rotatable housing 18, it is not rotatable relative to the housing. The exposed length T of the cutting blade extending from the end of the housing 18 is adjustable by a knurled adjustment screw 7 threaded into and forming a part of the housing 18. Within the bore in the housing 18 into which the adjustment screw 7 is threaded, there is a compression spring 10, note FIG. 3, which increases the frictional resistance of the threaded connection. Due to the compression spring 10, the adjusted position of the cutting blade remains unchanged even when the housing 18 is rotated relative to the handle 17.

As view in FIG. 3, housing 18 is supposed to be in one of its end positions, as determined by the limits formed by the slot 3, and it is held by a torsionally stressed spring 11 extending from the handle 17 into a bore in the opposite end of the housing 18 from the adjustment screw 7. One end 11a of the spring 11 has an ear, not illustrated, which engages within an axially extending recess 12 in the housing 18. The other end 11b of the spring 11 is secured within a recess, not illustrated, in the handle 17. The spring 11 inhibits undesired turning or rotation of the housing 18. The axial direction of the recess 12 refers to the axial or elongated direction of the handle 17 and the housing 18.

A holder stirrup 2 has a guide portion 2b extending axially into the handle 17. The part of the stirrup 2 projecting outwardly from the handle 17 is V-shaped with the pointed portion of the V-shaped art centered over the cutting blade 5. A tension spring 15 located within the handle biases the stirrup 2 into the handle. Spring 15 is secured at one end to a lug extending laterally from the stirrup portion 2b and at its other end it is connected to a retaining pin 14 extending transversely of the axial direction of the handle. In FIG. 2, the pin 14 is shown seated within one of two elongated receiving grooves 16a, 16b extending angularly relative to one another and formed in the bottom 17a of the handle 17. A bore 16c extends in the axial direction of the handle 17 from the groove 16b. Bore 16c forms a storage space for holding at least one spare cutting blade 5'.

In FIG. 2 it can be appreciated that bore 16c is accessible by displacing the transversely extending pin 14 in the direction indicated by the arrow P from the groove 16b into the other groove 16a. After a spare blade 5' is removed or a new spare blade is inserted into the bore 16c, the pin 14 is displaced back into the groove 16b and serves as a cover for the storage space.

Figure 6:
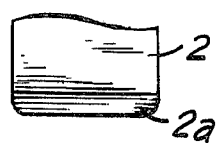
FIG. 6 is a plan view of the end portion of the holder stirrup displayed in FIG. 1.

As shown in FIG. 1, the free end 2a of the holder stirrup 2 is gradually flattened in the thickness direction though its width remains unchanged, providing a wedge-shaped end and not a punctiform end. The flattened end 2a is displayed in FIG. 6. Since the end 2a is flattened into something of a wedge-shaped, if needed, it can be used for breaking up the severed part of the insulation.

Figure 7:
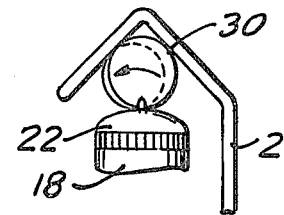
FIG. 7 is a side elevational view, on a smaller scale as compared to FIG. 1, of the cable supporting area on a known tool.
Figure 8:
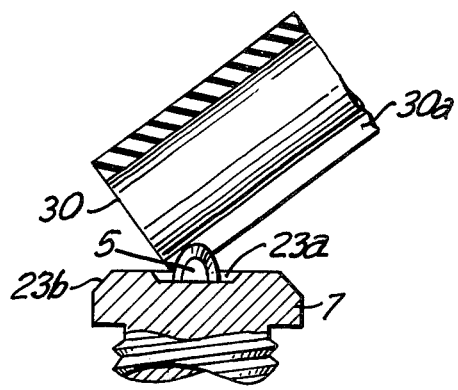
FIGS. 8 and 9 are partial side views, partly in section, illustrating the supporting area of the tool embodying the present invention and displayed on a larger scale than FIG. 1.

In known tools of the above-described type used for removing insulation from cables, the supporting surface surrounding the cutting blade is in the form of a spherical cap or surface, as exhibited in FIG. 7. With such a surface the cable 30 containing the insulation to be removed has the tendency to roll off on the supporting surface 22. In accordance with the present invention, the supporting surface surrounding the cutting blade 5 is in the form of a central recess 23a extending around the cutting blade 5 on the housing 18 or the adjustable screw 7 forming a part of the housing. Further, the surface radially outwardly of the recess 23a forms a bevelled edge 23b, note FIG. 8, or, alternatively, radially outwardly from the recess, the surronding surface is in the form of a spherical cap such as shown in FIG. 7.

In the illustrated embodiment, recess 23a is located within the surface of the adjustment screw 7, that is the end surface of the adjustment screw from which the cutting blade 5 projects. Blade 5 is locked in the housing 18 so that it cannot rotate or vary the extent to which it projects outwardly from the adjustment screw. The opposite end of the blade has its tongue 13 secured within the opening 19 so that it cannot turn relative to the housing 18. Adjustment screw 7 has an axially extending cylindrical bore 7a and the central part 5c of the cutting blade, see FIG. 3, is of a circular cross section so that it is reliably guided in all of the rotational positions of the adjustment screw 7 relative to the housing 18. The central or cylindrical part 5c of the blade 5 and the bore 7a are dimensioned so that the blade fits closely within the bore.

The supporting surface formed in the outer end of the adjustment screw 7 provides an improved boundary limit for the cable 30 held against the blade 5 by the holder stirrup 2 and prevents the cable from rolling off the supporting surface.

Figure 9:
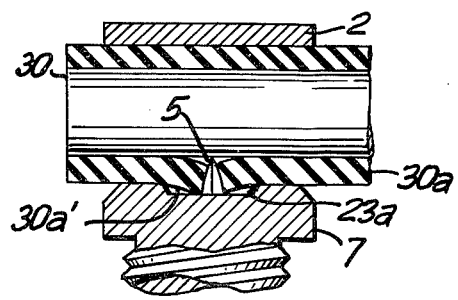

In addition to preventing rolling of the cable relative to the cutting blade, the tool embodying the present invention has the following advantages. As is shown in FIG. 9, when the cutting blade 5, projecting from the adjustment screw 7, penetrates into the insulation layer 30a of the cable 30, a bulge extending outwardly from the core of the cable is formed by the insulation layer and extends into the space in the recess 23a so that there is no increased friction as is present in the known tool, between the cable and the holder stirrup 2.

When the insulation has been severed the cutting blade may be rotated through 90° about its longitudinal axis and the insulation layer cut up in the axial direction of the cable. When the axial cut reaches its end the cable can be positioned somewhat obliquely relatively to the blade, as is displayed in FIG. 8. This arrangement ensures a cleaner cut through the insulation up to its very end.

Figure 5:
FIG. 5 is a cross-sectional view taken along the line V—V in FIG. 4.

Since the size of the bulge 30a' formed by the insulation projecting into the recess 23a depends on the volume of the cutting blade 5 penetrating into the insulation, it is advantageous if the operative portion of the blade is kept as narrow as possible, such as illustrated in cross-section in FIG. 5, and is provided with two cutting edges 5a, 5b. In cross-section at the two cutting edges 5a, 5b, the cutting blade 5 has the shape of a biconvex lens so that the cutting blade at the cutting edges is as narrow as possible. With such an arrangement the blade displaces a small amount of the insulation material and its resistance on cutting the insulation layer is smaller. Because the blade 5 has two cutting edges 5a, 5b, the tool can be turned about the cable 30 in either direction. In view of the possible movement of the blade in either direction around the cable, the slot 3 extends around the axis of the handle 17 so that the housing 18 can be rotated in the handle through 180°. As a result, the life of the blade 5 is increased, because when one of the cutting edges 5a, 5b becomes blunt, the other cutting edge may be positioned to cut in the preferred direction.

While the tool embodying the present invention is particularly suitable for removing insulation from relatively large diameter cables, such as in the range of 6 to 30 mm, in principle the tool is also suitable for stripping insulation from other sized cables.

While specific embodiments of the invention have been shown and described in detail to illustrate the application of the inventive principles, it will be understood that the invention may be embodied otherwise without departing from such principles.

We claim:

1. A tool for removing insulation from electrical cables, particularly large diameter cables, comprising in combination, a straight elongated handle having a longitudinal axis and an upper end and a lower end; a cutting blade housing having a rotational axis and an upper end and a lower end and being at its lower end rotatably mounted in the upper end of said handle so that said longitudinal axis and said rotational axis coincide; a straight elongated cutting blade member having an axis of symmetry, an upper end, a lower end and two cutting edge portions extending from a common point on the axis of symmetry at the upper end of the cutting blade member in a common plane on opposite sides of the axis of symmetry, said cutting blade member being non-rotatably mounted in said housing at the upper end of said housing so that the axis of symmetry coincides with said longitudinal and rotational axes; a holder stirrup having a first part slidably extending into said handle and a second part projecting from said handle and having the shape of an inverted V open towards said handle and having a straight edge at its crest in line with and transverse to said longitudinal and rotational axes and said axis of symmetry; operational means on said housing for the positive rotation of said housing relative to said handle and said stirrup; cooperating limiting means on said housing and on said handle for limiting the rotation of said housing to an angle of at least 90° so that said cutting blade member may be positively set in a first position for effecting a circular cut in which said common plane extends at right angles to said straight edges and to a second position for an axial cut in which said common plane extends parallel with said straight edge; said housing having at its upper end a supporting surface for supporting the cable to be stripped and said surface including a recess encircling said cutting blade member and having a bottom from which the operative part of the upper end of said cutting blade member extends in the straight direction and centrally in all rotational positions of said housing, said recess being arranged to receive, during the cutting operation, an outwardly bulging portion of the cable insulation when the insulation is being cut in the circular direction, and an end portion of the insulation when the insulation is being cut in the axial direction; said cutting blade member having a total length so that the lower end of said cutting blade member is markedly spaced from the lower end of said handle and at least one of said cutting edge portions extends at least to the bottom of said recess, said housing comprises an axially extending bore in the upper end thereof in which said cutting blade member is positioned, said housing including an adjustable blade holder threaded into said bore in said housing, said blade holder having a cylindrically shaped opening extending therethrough from an end surface thereof and said cutting blade member located within said opening in closely fitted contact with the surface of said opening and extending outwardly from said end surface, said supporting surface and said recess being formed in said end surface of said blade holder, said blade holder being threaded into said bore in said housing for exposing a selective length of said cutting blade outwardly from said recess, means within said housing for securing said cutting blade member against rotation relative to said housing when said blade holder is screwed in and out for adjustment purposes, said means comprising an engagement portion on the end of said blade fitting non-rotatably in a correspondingly shaped opening in said housing.

2. A tool, as set forth in claim 1, wherein said handle and said housing are provided with means for limiting the rotation of said housing relative to said handle through an angle of at least 90°.

3. A tool, as set forth in claim 2, wherein said handle comprises a wall, said means for limiting rotation comprises a slot formed in the wall of said handle with said slot extending transversely of the axial direction of said handle for at least an angular extent of 90°, a lever secured to said housing and projecting through said slot so that said housing is axially secured in said handle and the angular movement of said housing relative to said handle is limited by the opposite ends of said slot.

4. A tool, as set forth in claim 1, wherein means for located within said housing in contact with said blade holder for inhibiting rotational movement of said blade holder relative to said housing.

5. A tool, as set forth in claim 1, wherein a thin free end of said second part of said holder is gradually flattened in the thickness direction so as to taper to a pointed end while its width remains unchanged for providing a wedge-shaped end which can be inserted into a rectilinear cut in the insulation in order to break up the severed part of the insulation.

6. A tool, as set forth in claim 1, wherein the end surface of said blade holder from which said blade projects decreases in transverse cross-section toward said recess in said supporting surface.

7. A tool, as set forth in claim 1, wherein said handle having a storage space therein extending axially from said lower end for receiving at least one replacement cutting blade member, and a readily operable lock provided at the lower end for said storage space.

8. A tool, as set forth in claim 1, wherein the portion of said cutting blade limited by said two cutting edge portions has a cross-section in the shape of a bi-convex lens so that said cutting blade at said cutting edge is as narrow as possible.

9. A tool for removing insulation from cables, particularly large diameter cables, comprising a housing, a cutting blade positioned within and extending outwardly from said housing, said housing having a supporting surface through which said blade projects outwardly, said supporting surface arranged to support the cable to be stripped, a handle, said housing connected to said handle, a holder stirrup having a first part extending into said handle and a second part projecting from said handle, said second part being V-shaped for holding said cable against said blade and arranged to press the cable to be stripped against said blade, wherein the improvement comprises a recess in said supporting surface encircling said cutting blade projecting from said surface and said recess arranged to receive a portion of the cable insulation when the cable insulation is being cut, said handle has a first end into which said housing is mounted and an opposite second end, said handle having a storage space therein extending axially from said second end for receiving at least one replacement cutting blade, said first part of said holder stirrup is an elongated rectilinear part extending into said handle from the first end thereof, a spring located within said handle and in engagement with said first part of said holder stirrup for biasing said holder stirrup into said handle, a pin located at the second end of said handle extending transversely of the axial direction thereof, said spring secured to said pin, and said pin being securable in a first position and a second position on the second end of said handle with said pin forming a cover for the storage space in said handle in the first position and being displaceable from the storage space in the second position, and said spring securing said pin in the first and second positions.

10. A tool for removing insulation from cables, particularly large diameter cables, comprising a housing, a cutting blade positioned within and extending outwardly from said housing, said housing having a supporting surface through which said blade projects outwardly, said supporting surface arranged to support the cable to be stripped, a handle, said housing connected to said handle, a holder stirrup having a first part extending into said handle and a second part projecting from said handle, said second part being V-shaped for holding said cable against said blade and arranged to press the cable to be stripped against said blade, wherein the improvement comprises a recess in said supporting surface encircling said cutting blade projecting from said surface and said recess arranged to receive a portion of the cable insulation when the cable insulation is being cut, a free end of said second part has converging sides tapering to a pointed end so that the thickness of said holder stirrup at the end outside said handle has a reduced thickness. While its width remains unchanged, said handle has a first end into which said housing is mounted and an opposite second end, said handle having a storage space therein extending axially from said second end for receiving at least one replacement cutting blade, said first part of said holder stirrup is an elongated rectilinear part extending into said handle from the first end thereof, a spring located within said handle and in engagement with said first part of said holder stirrup for biasing said holder stirrup into said handle, a pin located at the second end of said handle extending transversely of the axial direction thereof, said spring secured to said pin, and said pin being securable in a first position and a second position on the second end of said handle with said pin forming a cover for the storage space in said handle in the first position and being displaceable from the storage space in the second position, and said spring securing said pin in the first and second positions.

11. A tool for removing insulation from cables, particularly large diameter cables, comprising a housing, a cutting blade positioned within and extending outwardly from said housing, a handle, said housing connected to said handle, a holder stirrup mounted on said handle and arranged to press the cable to be stripped against said blade, said handle being an axially elongated member having a first end mounting said housing and a second end, wherein the improvement comprises that a storage space is formed in the second end of said handle and arranged to hold at least one replacement cutting blade, said holder stirrup having a first part extending into said handle and a second part projecting outwardly from said handle, a spring located within said handle and having one end secured to the first part of said holder stirrup for biasing said holder stirrup into said handle, a pin located on the exterior of the second end of said handle, said spring secured to said pin and holding said pin against said second end, said pin being movable relative to the second end of said handle between a first position where said pin forms a closure for said storage space and a second position where said pin is displaced laterally from said storage space so that access to said storage space is available, and said spring securing said pin in said first and second positions.

* * * * *